United States Patent
Li et al.

(10) Patent No.: US 7,443,103 B2
(45) Date of Patent: Oct. 28, 2008

(54) HIGH PRESSURE LAMP WITH LAMP FLICKER SUPPRESSION AND LAMP VOLTAGE CONTROL

(75) Inventors: Jianwu Li, Solon, OH (US); Alan G. Chalmers, Akron, OH (US); Viktor K. Varga, Solon, OH (US); Timothy B. Gurin, Munson Township, OH (US); Gary R. Allen, Chesterland, OH (US); Anjali Kotkunde, Maharashtra (IN); James C. McNamara, South Euclid, OH (US)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 11/166,315

(22) Filed: Jun. 24, 2005

(65) Prior Publication Data

US 2006/0290292 A1    Dec. 28, 2006

(51) Int. Cl.
  *H05B 41/36* (2006.01)
(52) U.S. Cl. .................. 315/209 R; 315/291; 315/224; 315/DIG. 7
(58) Field of Classification Search ............. 315/209 R, 315/224, 225, 291, 307, 82, DIG. 7
  See application file for complete search history.

(56) References Cited

U.S. PATENT DOCUMENTS

| | | |
|---|---|---|
| 4,485,434 A | 11/1984 | Beeston et al. |
| 4,988,918 A | 1/1991 | Mori et al. |
| 5,608,294 A | 3/1997 | Derra et al. |
| 6,215,252 B1 | 4/2001 | Stanton |

(Continued)

FOREIGN PATENT DOCUMENTS

DE    36 36 901 A1    5/1998

(Continued)

OTHER PUBLICATIONS

Kaiser, W., et al., "Current pulse fed high-pressure-sodium lamps", *Conference Record of the 2002 IEEE Industry Applications Conference, 37th IAS Annual Meeting*, Pittsburgh, PA, Oct. 13-28, 2002, pp. 1499-1504.

*Primary Examiner*—Lincoln Donovan
*Assistant Examiner*—Ephrem Alemu
(74) *Attorney, Agent, or Firm*—Fay Sharpe LLP

(57) ABSTRACT

A method and system to supply current to a high pressure lamp is provided, the method and system comprising an alternating lamp current waveform with a half cycle mean amplitude I1 and a half cycle time duration T, a current pulse waveform including at least one current pulse with a half cycle mean amplitude I2 and at least one current pulse occurring after the trailing edge of a half cycle of the alternating lamp current, the pulse having a half cycle duration of Tp. These waveforms are combined to generate a current waveform including a current pulse waveform, the current pulse waveform starting after a time delay Td from the trailing edge of a half cycle of the alternating lamp current waveform, the time duration Tp of the at least one current pulse lasting less than the remaining time before the leading edge of the second half cycle of the alternating lamp current waveform. The combined current waveform supplies current to a high pressure lamp and produces a cone shaped tip protrusion which reduces lamp flicker.

31 Claims, 17 Drawing Sheets

U.S. PATENT DOCUMENTS

| | | |
|---|---|---|
| 6,232,725 B1 | 5/2001 | Derra et al. |
| 6,239,556 B1 | 5/2001 | Derra et al. |
| 6,278,244 B1 * | 8/2001 | Hevinga et al. ............ 315/291 |
| 6,586,892 B2 | 7/2003 | Derra et al. |
| 6,717,375 B2 | 4/2004 | Noguchi et al. |
| 7,122,960 B2 * | 10/2006 | Tukamoto et al. .......... 313/576 |
| 7,285,920 B2 * | 10/2007 | Riederer et al. ............ 315/246 |
| 2002/0011803 A1 | 1/2002 | Derra et al. |
| 2004/0090192 A1 | 5/2004 | Greenwood et al. |
| 2004/0183472 A1 | 9/2004 | Kamoi et al. |

FOREIGN PATENT DOCUMENTS

| | | |
|---|---|---|
| WO | WO 2005/120138 A | 12/2005 |

* cited by examiner

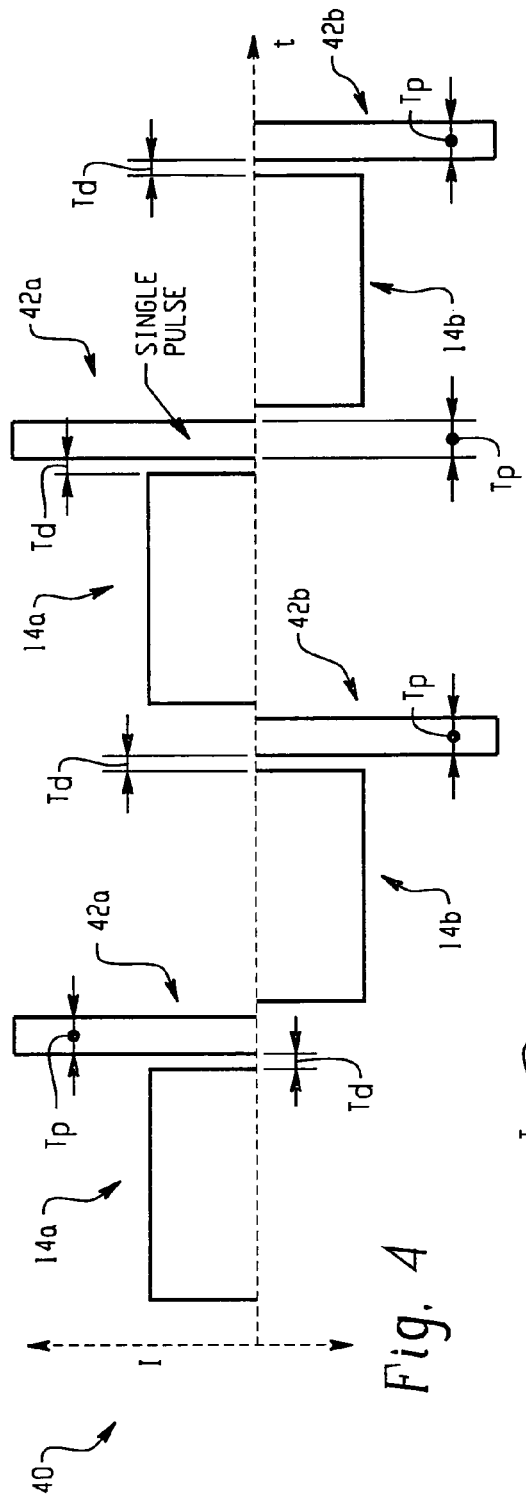
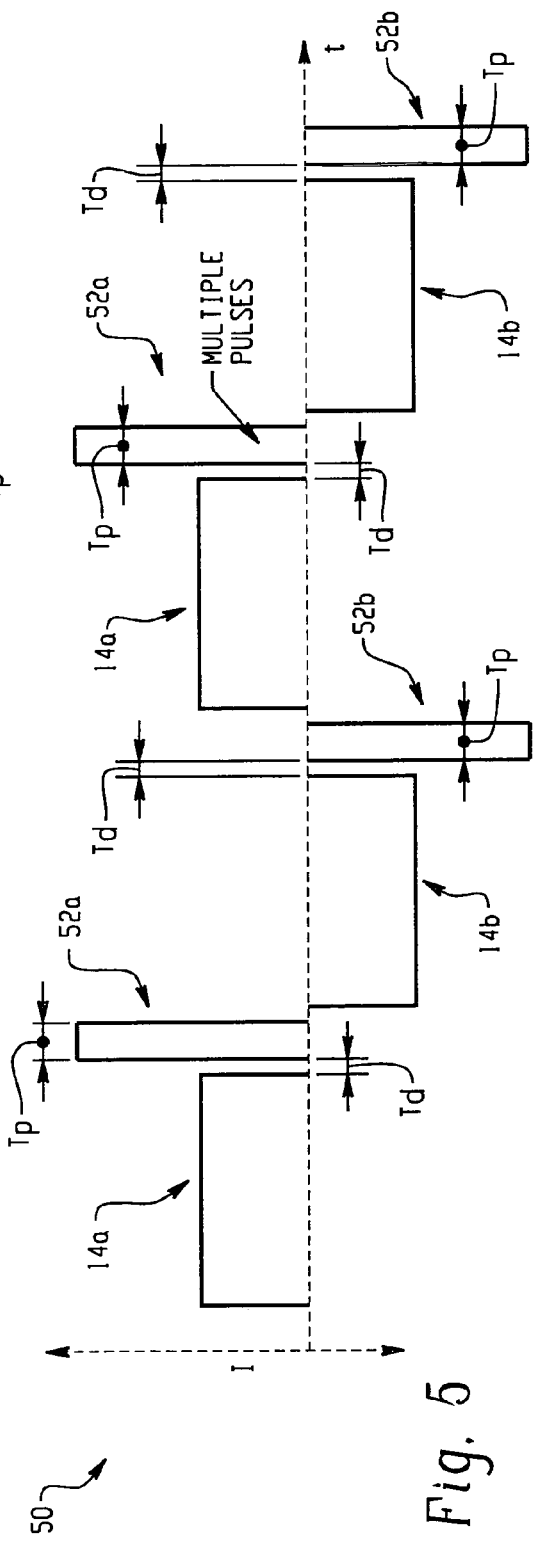

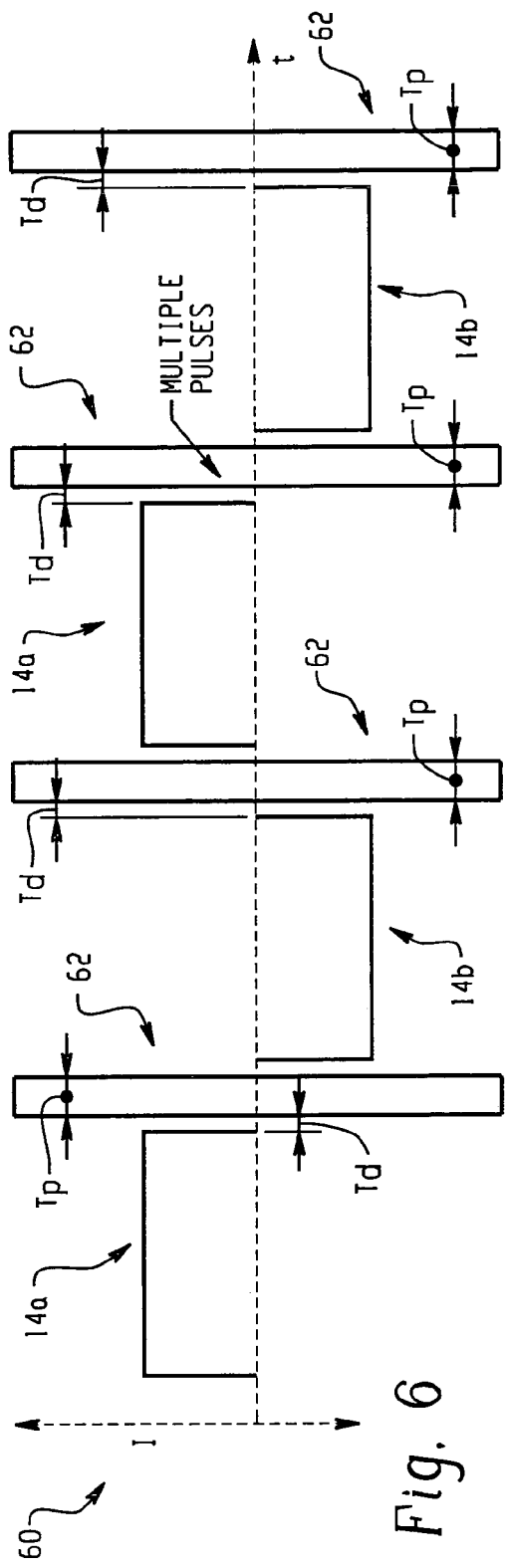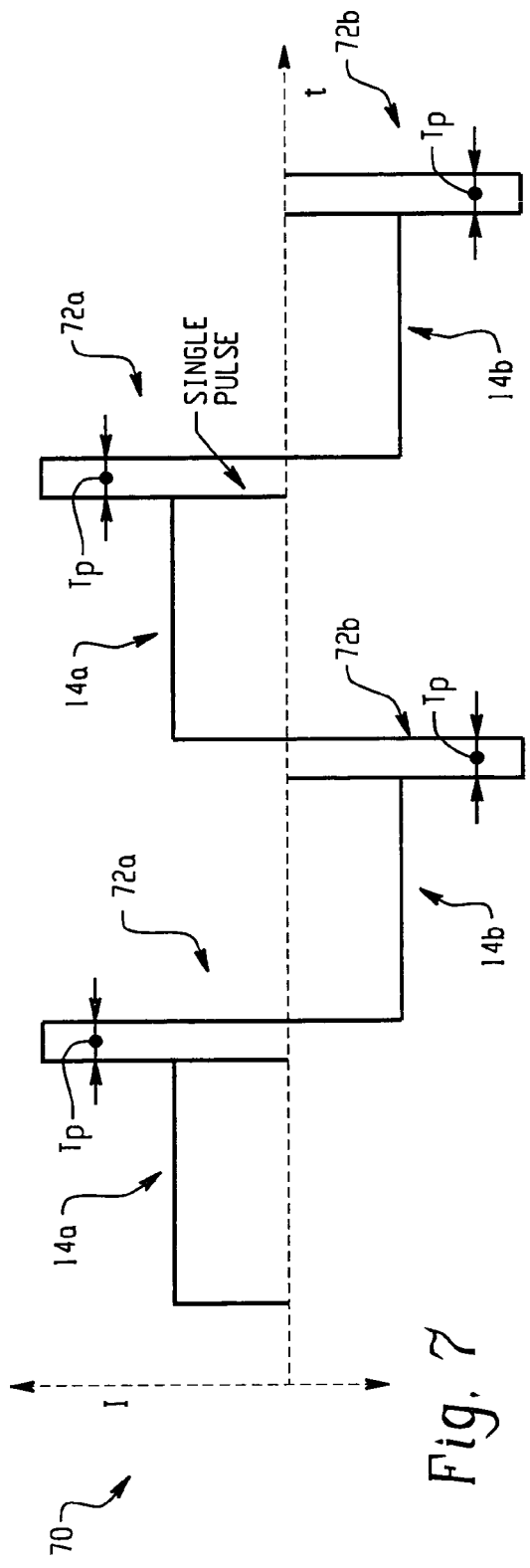

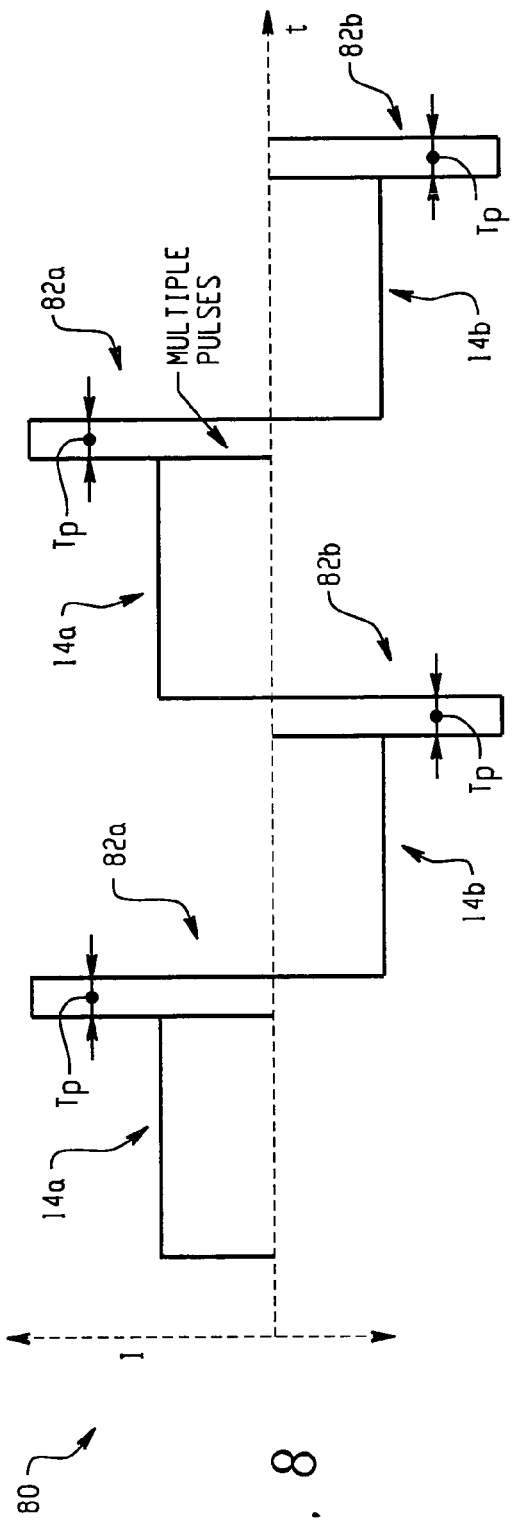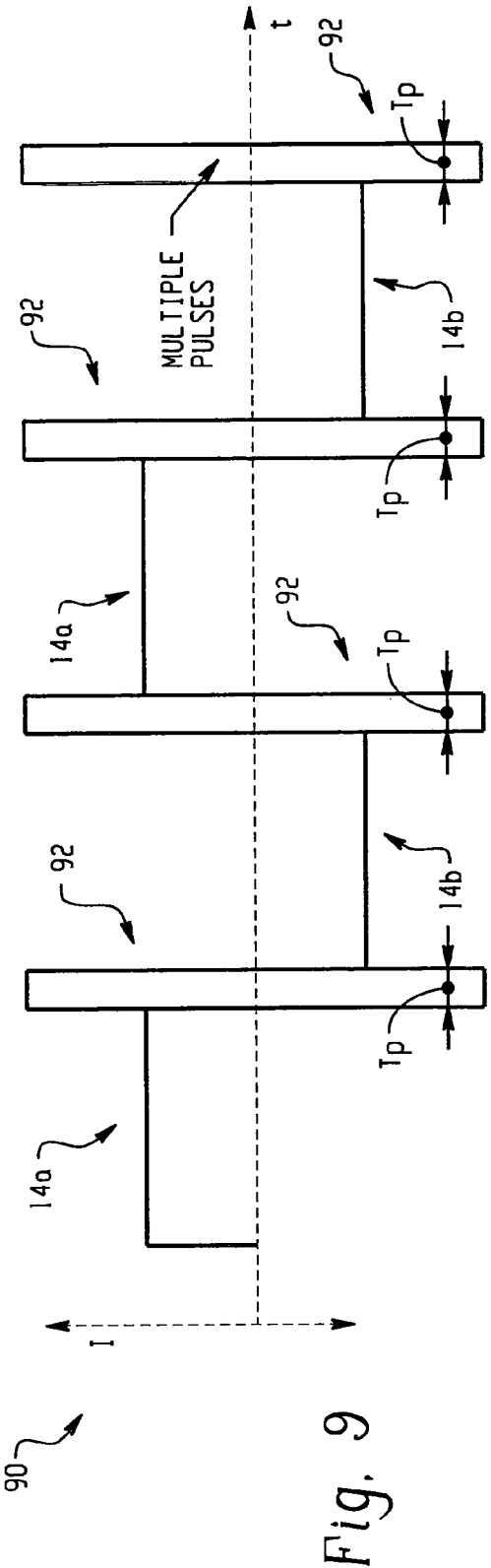

HIGH PRESSURE LAMP WITH LAMP FLICKER SUPPRESSION AND LAMP VOLTAGE CONTROL

BACKGROUND

Lamp flicker is a known problem in high pressure lamps, such as video projection lamps. It is critical to reduce the flicker in order to achieve high performance in projection lamp applications. The following relates to operating a high pressure lamp to reduce flicker.

Lamp flicker in a high pressure lamp is associated with the temperature and physical characteristics of the electrode tip protrusions. Often, a discharge arc from the cathode electrode to the anode electrode is not stable because the origin of the discharge arc is not stable. An electrode that is too cold or hot will produce micro spikes resulting from the electrode discharge arc jumping from one spot on the electrode to a different spot on the electrode. This is perceived by a viewer as flicker. U.S. Pat. No. 5,608,294 (hereafter referred to as Derra et al.) proposes one solution to this problem and discusses the reasons for flicker understood by one of skill in the art of high pressure lamps. Derra et al. discloses an alternating lamp current with a current pulse superimposed on the latter part of the half cycle of the alternating lamp current for operating a high pressure discharge lamp to reduce flicker. The method disclosed by Derra et al. is limited to a lamp current waveform supplying a lamp that includes a current ratio Ri in the range of 0.6 to 2.0 and a duration ratio Rt in the range of 0.05 to 0.15. The current ratio Ri is defined as the mean amplitude of the current pulse to the mean amplitude of the alternating lamp current. The duration ratio Rt is defined as the duration of the current pulse to the duration of a half cycle of the alternating lamp current. U.S. Pat. No. 4,485,434 (hereafter referred to as Beeston et al.) describes a power supply for supplying power to arc lamps. U.S. Pat. No. 5,608,294, Derra et al., and U.S. Pat. No. 4,485,434, Beeston et al. are hereby incorporated by reference.

There is a need for current waveforms, other than those taught in Derra et al., to control lamp flicker in high intensity discharge lamps. Additional waveforms will provide alternatives to the designer of lamp circuits to minimize associated costs to reduce flicker. In addition, there is a need for a device and method to generate alternative waveforms that include the combination of an alternating lamp current and one or more pulses. Finally, there is a need for a method of controlling a high intensity lamp to maintain constant power and reduce flicker by varying Rt and Ri.

BRIEF DESCRIPTION

Provided is a system and method of operating a high pressure discharge lamp to significantly reduce flicker by selecting an optimal Rt and Ri for a lamp current supplying a high pressure lamp. In addition, an apparatus and method are provided to reduce flicker by combining one or more current pulses with an alternating lamp current such that the leading edge of the current pulse occurs substantially simultaneously with or after a time delay Td from the trailing edge of a half cycle of the alternating lamp current, i.e., the current pulse is not superimposed on the later part of a half cycle of the alternating lamp current.

Also provided is a method of controlling the size of the electrode tip diameter, electrode tip protrusion length and electrode tip growth rate by controlling the current ratio Ri and duration ratio Rt of the alternating lamp current supplying a high pressure lamp. By controlling the current ratio Ri and duration ratio Rt of the alternating lamp current, the electrode tip protrusion size and electrode tip growth rate can be controlled to provide further stabilization of the electrode tip and further reduce flicker.

Furthermore, a method is provided to effectively control the lamp operation voltage to a desired target that will significantly improve the lamp performance and lamp life.

BRIEF DESCRIPTION OF THE DRAWINGS

FIGS. 4-6 illustrate lamp currents, with substantial delay, used to supply a high pressure lamp.

FIGS. 7-9 illustrate lamp currents, without substantial delay, used to supply a high pressure lamp.

DETAILED DESCRIPTION OF THE INVENTION

Figure 1:
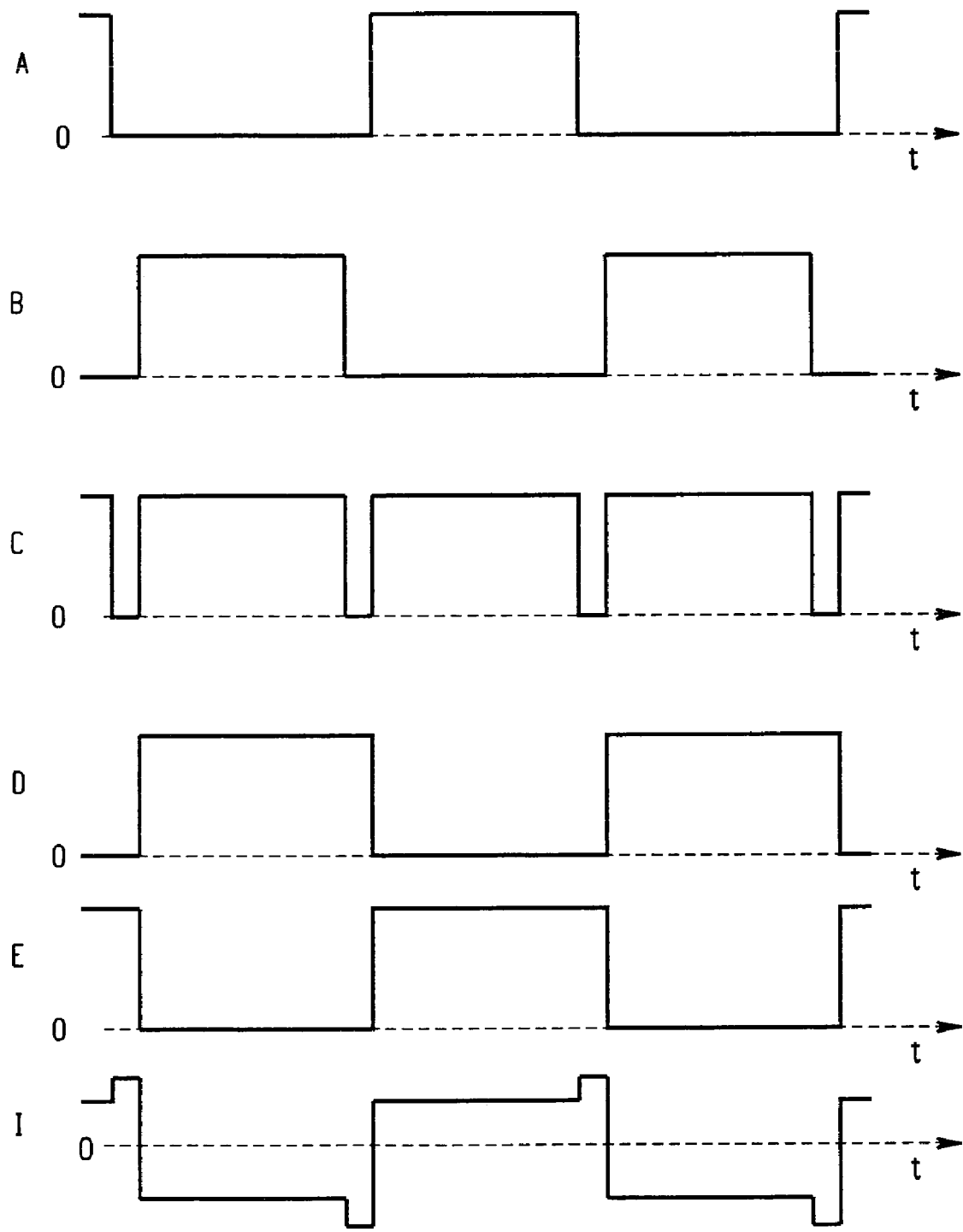
FIG. 1 is a prior art arrangement of a lamp circuit used with high pressure lamps.

FIG. 1 shows the prior art arrangement of Derra, et al. —U.S. Pat. No. 5,608,294. As briefly noted above, the Derra patent discloses a method of operating and a circuit arrangement for suppressing flickering in a high pressure discharge lamp. A current pulse is generated in a fraction of the half period or cycle of the lamp current. The current pulse has the same polarity as the lamp current and is superimposed in the latter pat of the half cycle. In this manner, the total amount of current flowing through the lamp is increased, and likewise the temperature of the lamp electrode is increased. The increased temperature raises the stability of the discharge arc and as a result, the arc originates from the same place on the electrode.

However, as noted above, Derra identifies selected limits to operating ranges. Specifically, Derra limits Ri to the range of 0.6 to 2.0 and Rt in the range of 0.05 to 0.15. There are still other ranges of effective operation outside of those noted in Derra. In the present disclosure, it has been determined that lamp flicker is effectively suppressed in high pressure lamps by using waveforms of the same general type as disclosed in Derra (i.e., superimposed waveforms resulting from superimposing a current pulse on an alternating lamp current) but in different ranges. Here, Ri preferably ranges from equal to or greater than 2.0 to less than or equal to 4.0, where Ri=I2/I1 where I1 is defined as the half cycle mean amplitude of the alternating lamp current and I2 is the half cycle mean amplitude of the current pulse. It has also been determined that the duration ratio Rt may range from being equal to or greater than 0.2% and equal to or less than 50%, or more particularly ranging from 0.2% to 35% where Rt=Tp/T and T is the half cycle time duration of the alternating lamp current and Tp represents the duration of the alternating current pulse.

In another exemplary embodiment of the present invention, a lamp current waveform 10 is used to drive a high pressure lamp. The lamp current waveform 10 is composed of one or more current pulses 12 (positive portion 12a and negative portion 12b) and an alternating lamp current 14 (positive portion 14a and negative portion 14b). While shown in FIG. 2 as a rectangular alternating current pulse 12, the shape of the current pulse is not critical. Examples of acceptable current pulse shapes include rectangular, square, sinusoidal, triangular, and exponential, among others. By selecting a proper current ratio Ri and duration ratio Rt for the lamp current 10, electrode tip protrusion can be controlled and lamp flicker significantly reduced. In addition, by controlling the current ratio Ri and duration ratio Rt of the lamp current 10, the electrode tip protrusion diameter, electrode tip protrusion length, and electrode tip growth speed can be controlled to provide additional stabilization of the electrode tip and provide an added reduction of lamp flicker.

Figure 2:
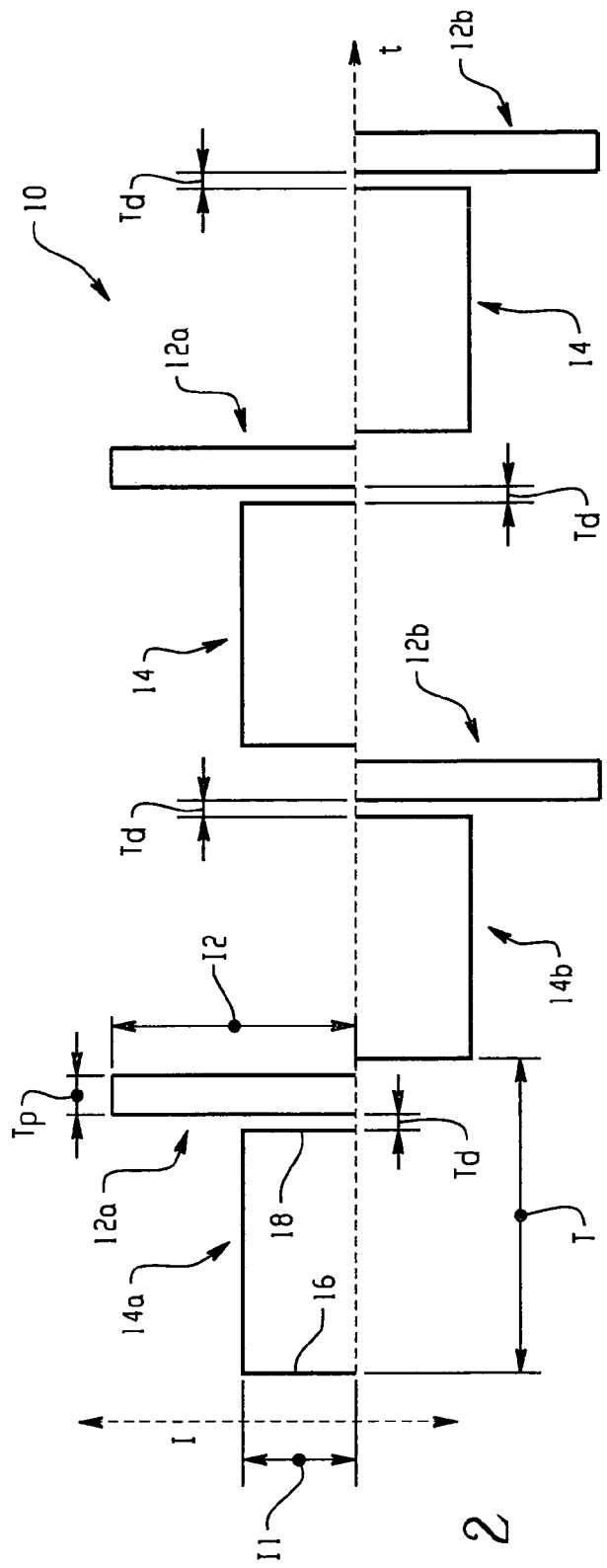
FIG. 2 illustrates a lamp current used to supply a high pressure lamp.
Figure 12:
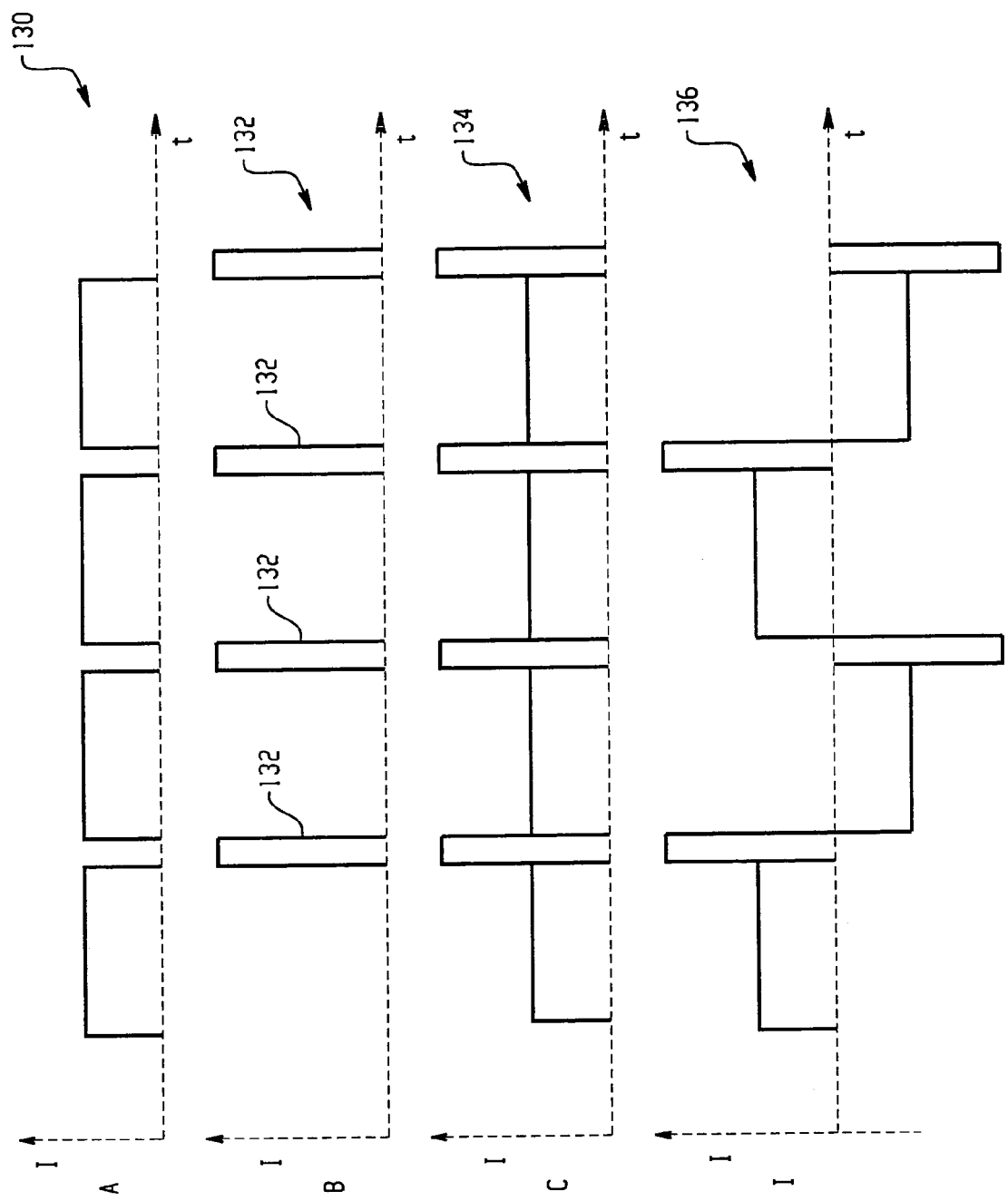
FIG. 12 illustrates the timing of the signals used to generate a lamp current with a pulse or pulses commencing, without substantial delay, according to FIG. 10.

With continuing reference to FIG. 2, lamp current 10 is configured to include an alternating current square waveform 14 having positive going portions 16 and negative going portions 18, and an alternating current rectangular pulse waveform 12 having positive going portions 12a and negative going portions 12b. This lamp current 10 is used to drive a high pressure lamp with reduced flicker. I1 represents the half cycle mean amplitude of the alternating lamp current 14, and I2 represents the half cycle mean amplitude of the alternating current pulse 12. T is the half cycle time duration of the alternating lamp current. Td represents the duration of time from the trailing edge of the half cycle of the alternating lamp current 14 and the leading edge of the alternating current pulses 12, and Tp represents the half cycle time duration of the alternating current pulse 12. The pulse 12 follows an alternating lamp current half cycle 14. The lamp current waveform of FIG. 2 is used to stabilize the lamp flicker of a high pressure lamp by controlling the current ratio Ri=I2/I1 and duration ratio Rt=Tp/T. A non-superimposed relation of the alternating lamp current 14 and the current pulse 12 reduces flicker, e.g., a distinct time separation or time delay Td such as shown in FIG. 2 can be used, or a zero or no time delay could be used as shown in FIG. 12 and as will be described further below.

Figure 3:
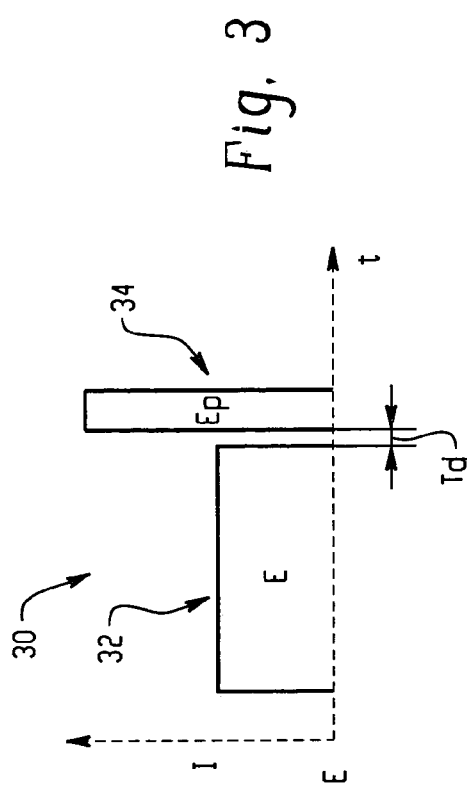
FIG. 3 illustrates a lamp current, represented as an energy waveform, used to supply a high pressure lamp.

Referring to FIG. 3, shown is a portion of the lamp current waveform 10 of FIG. 2, graphically represented as an energy diagram 30 where E represents the total energy of a half cycle of the alternating lamp current 32, and where Ep represents the total energy of a half cycle of the current pulse 34. The leading edge of the current pulse 34 commencing after a time delay Td from the trailing edge of the half cycle of the alternating lamp current. The energy diagram of FIG. 3 represents an energy waveform to stabilize the lamp flicker of a high pressure lamp by controlling the energy ratio Re=Ep/E.

Testing results prove that improved stability of the electrode and a cone-shaped tip protrusion result when Ri, Rt, and Re ratios are each within a specific range. This improved stability and electrode shape reduce flicker significantly. The preferred ranges include the following:
Ri=0.5 to 4.0;
Rt=0.2% to 50%; and
Re=0.2% to 50%.

More particularly, operation may be in some embodiments in the range of, Rt=0.2% to 35%.

Referring to FIGS. 4-6, these waveforms represent exemplary embodiments that provide improved electrode stability and cone-shaped protrusions with significantly reduced flicker. These embodiments include the following ranges associated with Ri, Rt, and Re.
Ri=0.5 to 4.0;
Rt=0.2% to 50%; and
Re=0.2% to 50%.

More particularly, operation may be in some embodiments in the range of, Rt=0.2% to 35%.

FIG. 4 represents a lamp waveform 40 for supplying a high pressure lamp including a single pulse 42a of the same polarity as the previous half cycle 14a of an alternating lamp current 14. The leading edge of the pulse 42a commences after the trailing edge of the half cycle 14a of the alternating lamp current waveform. As shown in the figure, the pulse 42a is generated after a time delay Td from the end of a half cycle 14a of the alternating lamp current. More particularly, in operation, a time delay Td may be in some embodiments in the range of up to 20 ms. More particularly, a time delay Td up to 0.5 ms produces no observable flicker. As the time delay Td becomes longer, i.e., greater than 20 ms, the lamp arc extinguishes more frequently and lamp flicker starts to become detectable by the human eye. Similarly, a negative pulse 42b commences after the trailing edge of the negative half cycle portion 14b of the alternating lamp current.

The shape of the pulse 42 is not critical for operation of the lamp. For example, the shape of the pulse can be rectangular, square, sinusoidal, triangular or exponential, among others. By this design, which includes a time delay Td prior to generation of the single current pulse 42, a non-superimposed relationship exists between the end of a half cycle of the alternating lamp current 14 and the current pulse 42. A benefit of having some delay may exist to create distinct waveforms, the distinct waveform portions 42 and 14 permitting the generation of the waveform portions 42 and 14 using simplified circuit designs having a lower associated cost.

FIG. 5 represents a lamp current waveform 50 embodiment for supplying a high pressure lamp including multiple pulses 52, at a frequency greater than about 1 Hz, of the same polarity as the previous half cycle of an alternating lamp current 14. The multiple pulses all occur within a half cycle time duration Tp and have a half cycle mean amplitude I2. The leading edges of the pulses 52a, 52b commence after the trailing edges of the half cycles 14a, 14b, respectively, of the alternating lamp current. As represented by the figure, multiple pulses are added after a time delay Td from the end of a half cycle of the alternating lamp current 14. The shape of the multiple pulses 52 is not critical for operation of the lamp. Again, the shape of the pulses can be rectangular, square, sinusoidal, triangular or exponential, among others. It is to be understood that these multiple pulses and multiple pulses of other figures, include multiple pulse transitions, not shown in the figure.

FIG. 6 represents a lamp current waveform 60 embodiment for supplying a high pressure lamp including multiple pulses 62, at a frequency greater than about 1 Hz, of the same polarity and opposite polarity as the previous half cycle of an alternating lamp current. The bi-polarity pulses 62 commence after the trailing edge of a half cycle 14a or 14b of the alternating lamp current. As shown in the figure, the leading edge of the pulses 62 commences after a time delay Td from the end of a half cycle of the alternating lamp current. The shape of the pulses is not critical for operation of the lamp. For example, the shape of the pulses can be rectangular, square, sinusoidal, triangular or exponential, among others. It is to be understood that these multiple pulses and multiple pulses of other figures, include multiple pulse transitions, not shown in the figure.

Referring to FIGS. 7-9, these figures represent other current waveform embodiments, namely non-superimposed current waveform embodiments, for supplying a high pressure lamp to reduce flicker while providing improved stability and a cone-shaped protrusion. As shown in the figures, these non-superimposed waveforms do not include a delay between the start of the current pulses 72, 82, or 92 and the end of a half cycle of the alternating lamp current 14. However, it is to be understood that the leading edge of the current pulse 72 of FIG. 7 commences substantially instantaneously after the trailing edge of a half cycle of the alternating lamp current waveform 14. These waveforms include the following ranges associated with Ri, Rt, and Re.

Ri=0.5 to 4.0;
Rt=0.2% to 50%; and
Re=0.2% to 50%.

More particularly, operation may be in some embodiments in the range of, Rt=0.2% to 35%.

FIG. 7 represents a lamp current waveform 70 embodiment for supplying a high pressure lamp including a single pulse 72 of the same polarity as the half cycle of an alternating lamp current waveform 14. The pulse 72a or 72b commences, without delay, (i.e. substantially instantaneously) after the end of a half cycle 14a or 14b, respectively, of the alternating lamp current 14. As noted with the previous embodiments, the shape of the pulse is not critical for operation of the lamp. For example, the shape of the pulse can be rectangular, square, sinusoidal, triangular or exponential, among others.

FIG. 8 represents another non-superimposed lamp current waveform 80 embodiment for supplying a high pressure lamp including multiple pulses 82a or 82b, at a frequency greater than about 1 Hz, of the same polarity as the respective half cycle 14a, 14b of an alternating lamp current 14. The pulses 82 commence, without delay, (i.e. substantially instantaneously) after a half cycle of the alternating lamp current 14 and can be of varying shapes such as rectangular, square, sinusoidal, triangular or exponential, among others. It is to be understood that these multiple pulses and multiple pulses of other figures, include multiple pulse transitions, not shown in the figure.

FIG. 9 represents a lamp current waveform 90 embodiment for supplying a high pressure lamp including multiple bi-polar pulses 92, at a frequency greater than about 1 Hz, of the same and opposite polarity as the half cycle of an alternating lamp current 14. The bi-polar, or alternating polarity, pulses commence, without delay (i.e., substantially instantaneously), after the end of a half cycle of the lamp current waveform 14. Thus, the current pulses are not superimposed with the half cycle of the lamp current. The shape of the pulse can be rectangular, square, sinusoidal, triangular or exponential, among others. It is to be understood that these multiple pulses and multiple pulses of other figures, include multiple pulse transitions, not shown in the figure.

Figure 10:
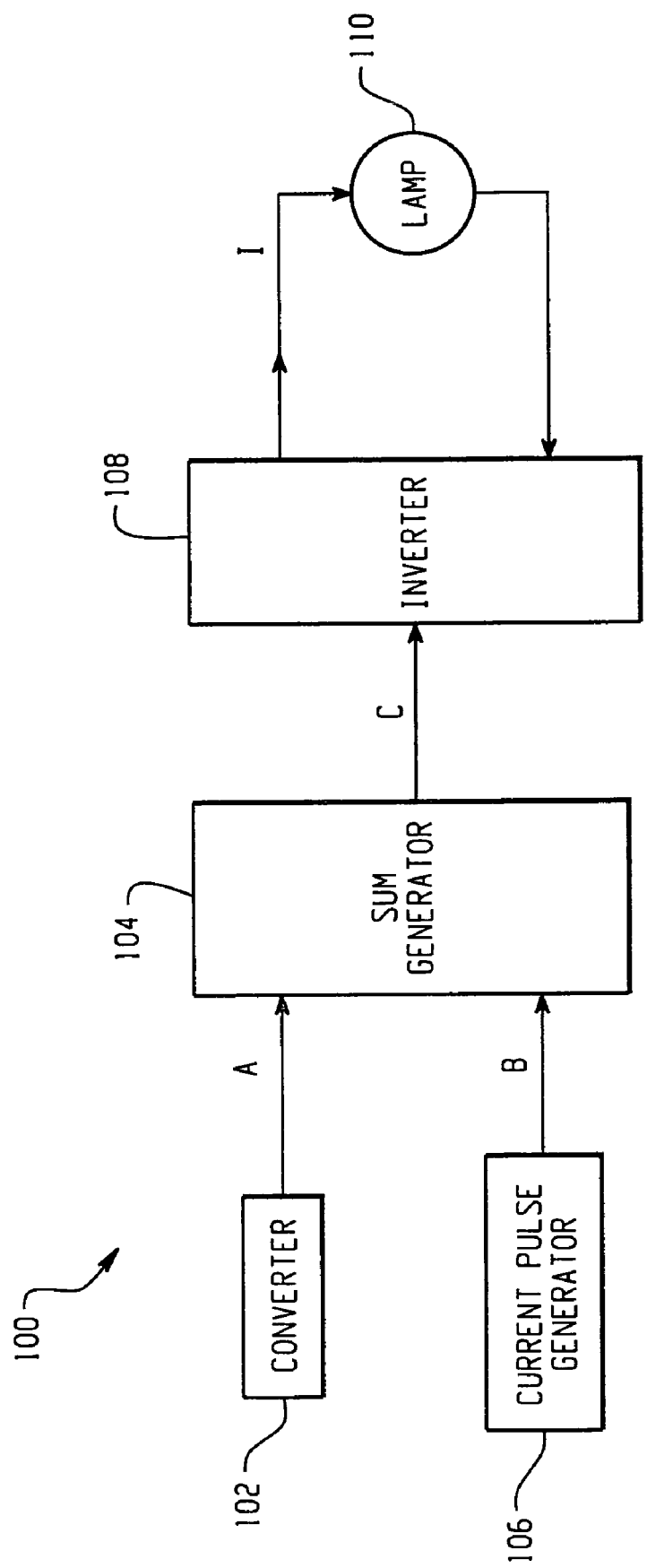
FIG. 10 is a block diagram of a system used to generate a lamp current according to an exemplary embodiment.

Referring to FIG. 10, this figure illustrates one exemplary embodiment of a circuit 100 used to generate the described waveforms being supplied to a high pressure lamp. As shown, this embodiment includes a converter 102 to supply a dc current square wave, or alternatively a dc signal, to a sum generator 104 input. The converter 102 output is represented as reference character A. A current pulse generator 106 supplies a dc current pulse waveform to another input of the sum generator 104. The current pulse generator output is represented as reference character B. The sum generator 104 combines the current pulse waveform and the current square waveform and outputs this signal to an inverter 108 which converts the dc current waveform to an ac current waveform. The sum generator 104 output is represented as reference character C. The ac current waveform output from the inverter 108 supplies a high pressure lamp 110, such as a video projection lamp. The lamp input is represented as reference character I.

Figure 11:
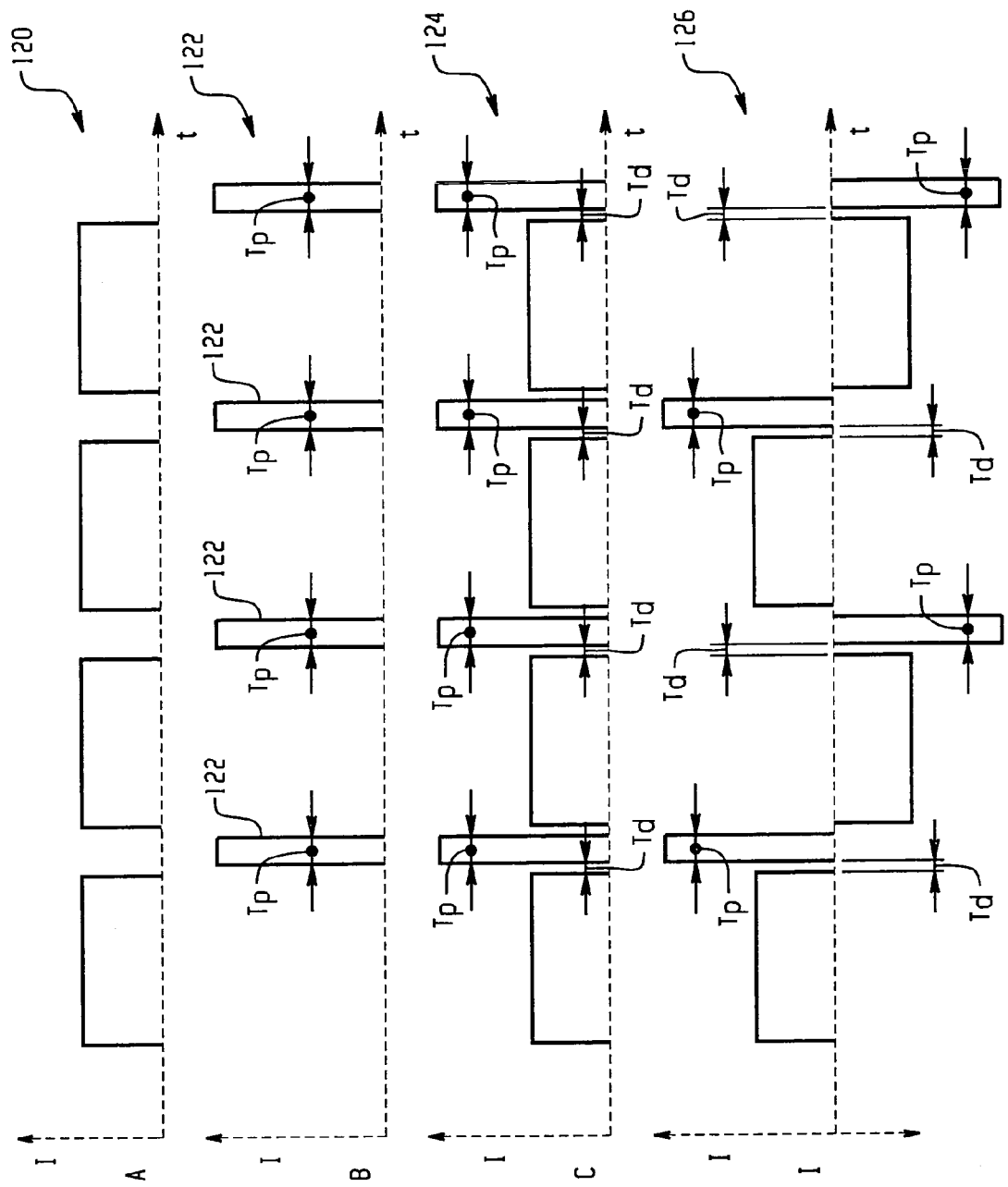
FIG. 11 illustrates the timing of the signals used to generate a lamp current with pulses commencing, according to FIG. 10, after the end of a half cycle of an alternating lamp current.

FIG. 11 illustrates one embodiment of current waveforms and their relative timing, generated by circuit 100 of FIG. 10. The converter 102 supplies a dc current waveform 120 to the sum generator 104 input. The converter output is represented as reference character A. The current pulse generator 106 supplies a dc current single pulse or multiple pulses 122, at a frequency greater than about 1 Hz, to another input of the sum generator 104. The current pulse generator output is represented as reference character B. The sum generator 104 combines the current pulse waveform 122, and the sum generator 104 output waveform 124 is supplied to inverter 108. The sum generator output is represented as reference character C. The inverter 108 converts the sum generator 104 output current waveform 124 to an ac lamp current waveform 126. The ac current waveform output 126 from the inverter 108 is represented as reference sign I and supplies a high pressure lamp 110, such as a video projection lamp. As will be appreciated by one skilled in the art, waveform 126 is intended to be representative of the waveforms of FIGS. 4-5 where a pulse waveform is a single or multiple pulse waveform.

FIG. 12 illustrates another embodiment of waveforms and their relative timing, generated pursuant to circuit 100 of FIG. 10 in a manner as described above. Here, the circuit generates a lamp current waveform with pulses commencing, without delay (i.e. substantially instantaneously), after the end of a half cycle of an alternating lamp current. The converter 102 supplies a dc current square wave 130 to the sum generator 104 input. The sum generator 104 combines the current pulse waveform 132, without any delay Td (i.e. substantially instantaneously), and the sum generator 104 output waveform 134 is supplied to inverter 108. The converter output is identified as waveform A, the current pulse generator output is B, and the sum generator output is represented as reference character C. The inverter output is represented as reference character I and supplies the high pressure lamp 110.

Figure 13:
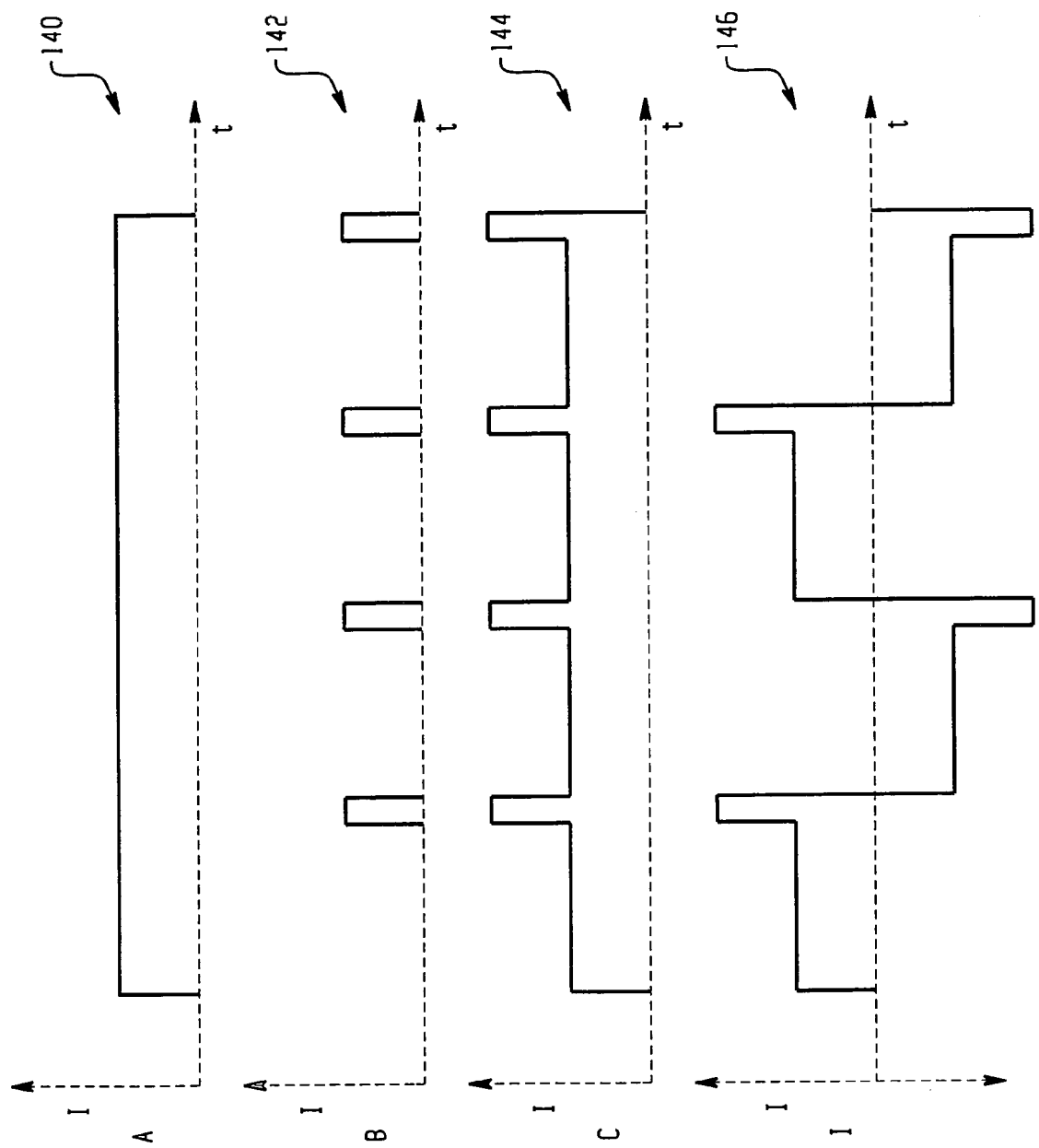
FIG. 13 illustrates the timing of the signals used to generate a lamp current using a DC signal, according to FIG. 10.

Referring to FIG. 13 illustrates another embodiment of waveforms and their relative timing, relative to circuit 100 of FIG. 10, used to generate a lamp current waveform with pulses commencing where the current pulse is superimposed on the ac current like Derra, after the end of a half cycle of an alternating current. The converter 102 supplies a dc current 140 to the sum generator 104 input. The sum generator output where the converter output A is superimposed with the current pulse generator output B is represented as reference character C. The inverter 108 converts the sum generator 104 output current waveform 144 to an ac lamp current waveform 146, identified by reference character I, that supplies a high pressure lamp 110, such as a video projection lamp.

Figure 14:
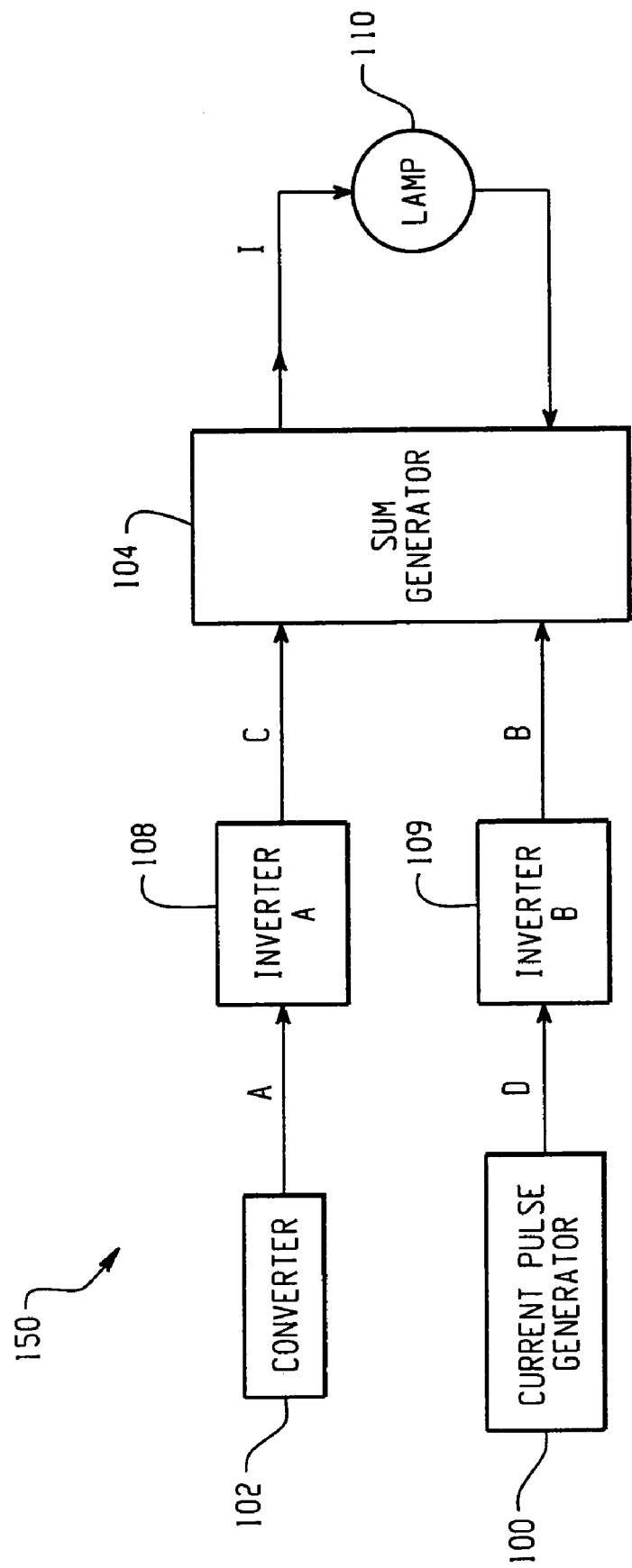
FIG. 14 illustrates an exemplary embodiment to supply a lamp current to a high pressure lamp by combining a current pulse with an alternating current.

In FIG. 14, another exemplary embodiment of a circuit 150 used to generate the described current waveforms being supplied to a high pressure lamp is illustrated. As shown, this embodiment includes a converter 102 to supply a dc current to inverter 108 input. The converter 102 output is represented as reference character A. The inverter 108 outputs an ac current to sum generator 104. The inverter 108 output is represented as reference character C. Current pulse generator 106 supplies a dc current pulse to inverter 109. Inverter 109 outputs an ac current pulse waveform to an input of the sum generator 104. The ac current pulse waveform output is represented as reference character B. The sum generator 104 combines the ac current pulse waveform with the ac current waveform and supplies the resulting ac current waveform to a high pressure lamp 110, such as a video projection lamp. The lamp input is represented as reference character I.

Figure 15A:
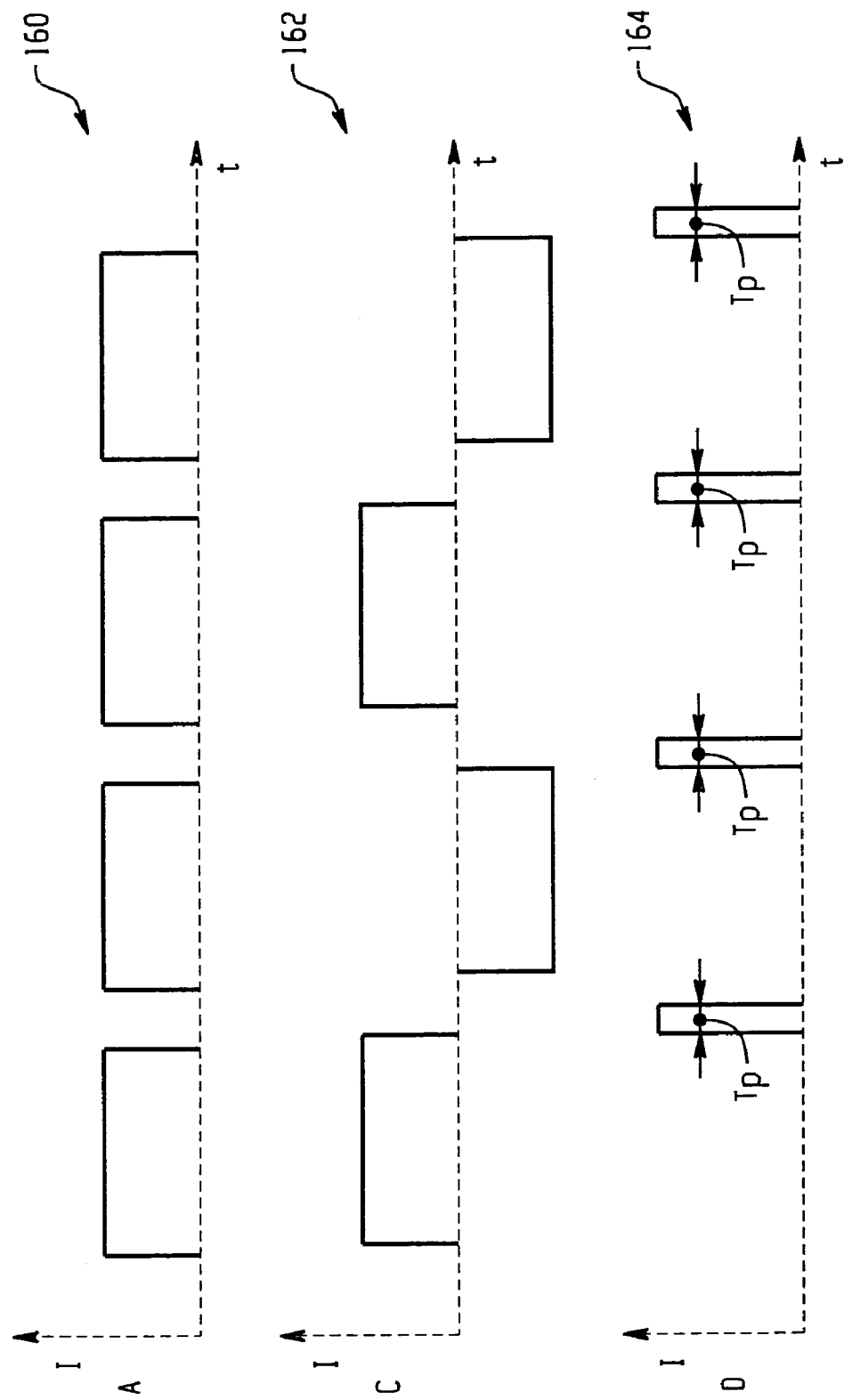
FIG. 15 illustrates the timing of the signals used to generate a lamp current, according to FIG. 14, with pulses commencing after the end of a half cycle of an alternating current.
Figure 15B:
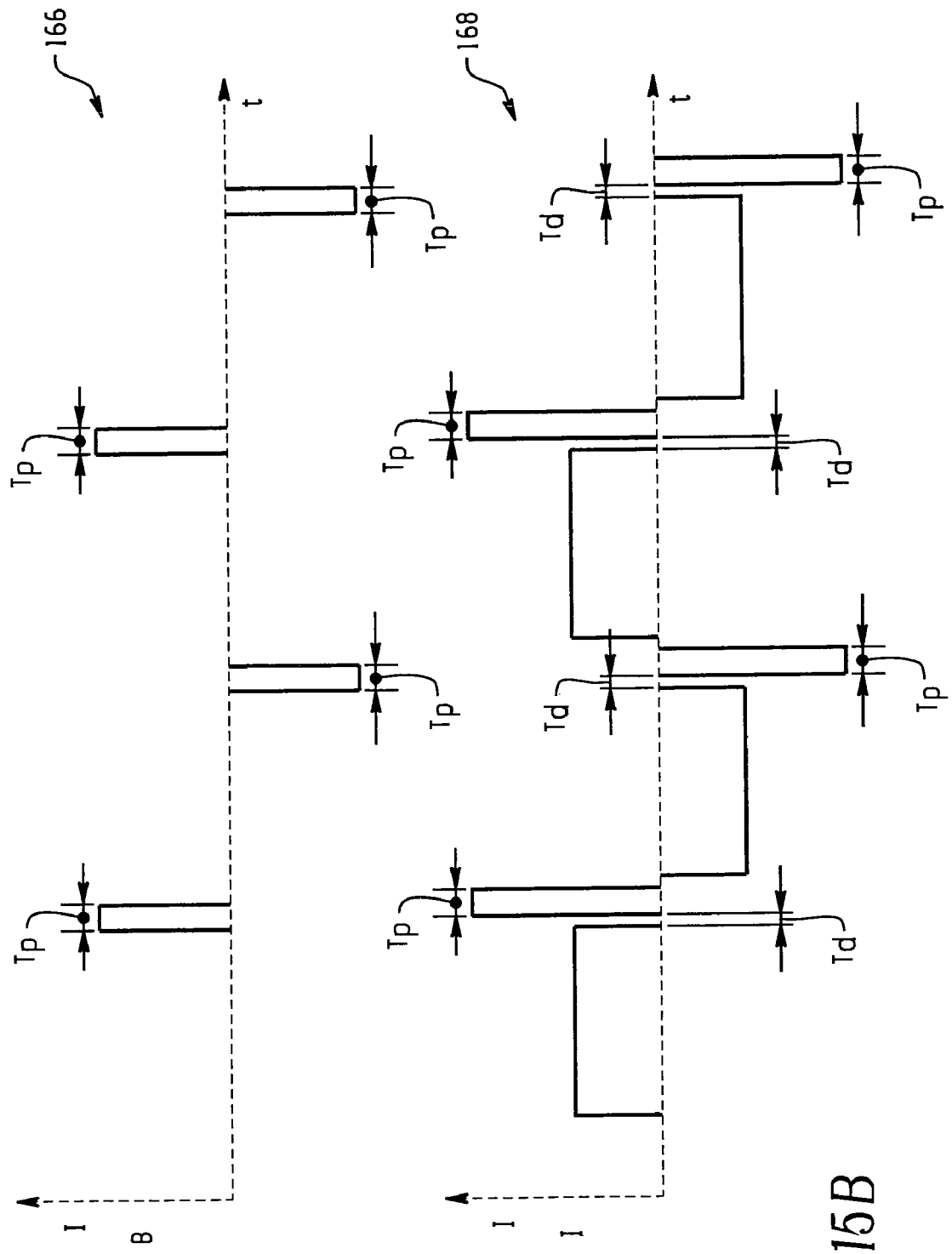

One embodiment of waveforms and their relative timing generated by circuit 150 of FIG. 14 is exemplified in FIG. 15. The converter 102 supplies dc current 160 (reference character A) to the inverter 108 input. The inverter 108 outputs an ac current 162 (reference character C) to the sum generator 104. The current pulse generator 106 supplies a dc current pulse 164 (reference character D) to inverter 109. Inverter 109 outputs an ac current pulse 166, reference character B, to an input of the sum generator 104. The sum generator 104 combines the ac current pulses 166 and the ac current 162, after a delay of Td, and the sum generator 104 outputs an ac lamp current waveform 168, reference character I, which is supplied to the high pressure lamp 110, such as a video projection lamp.

Figure 16:
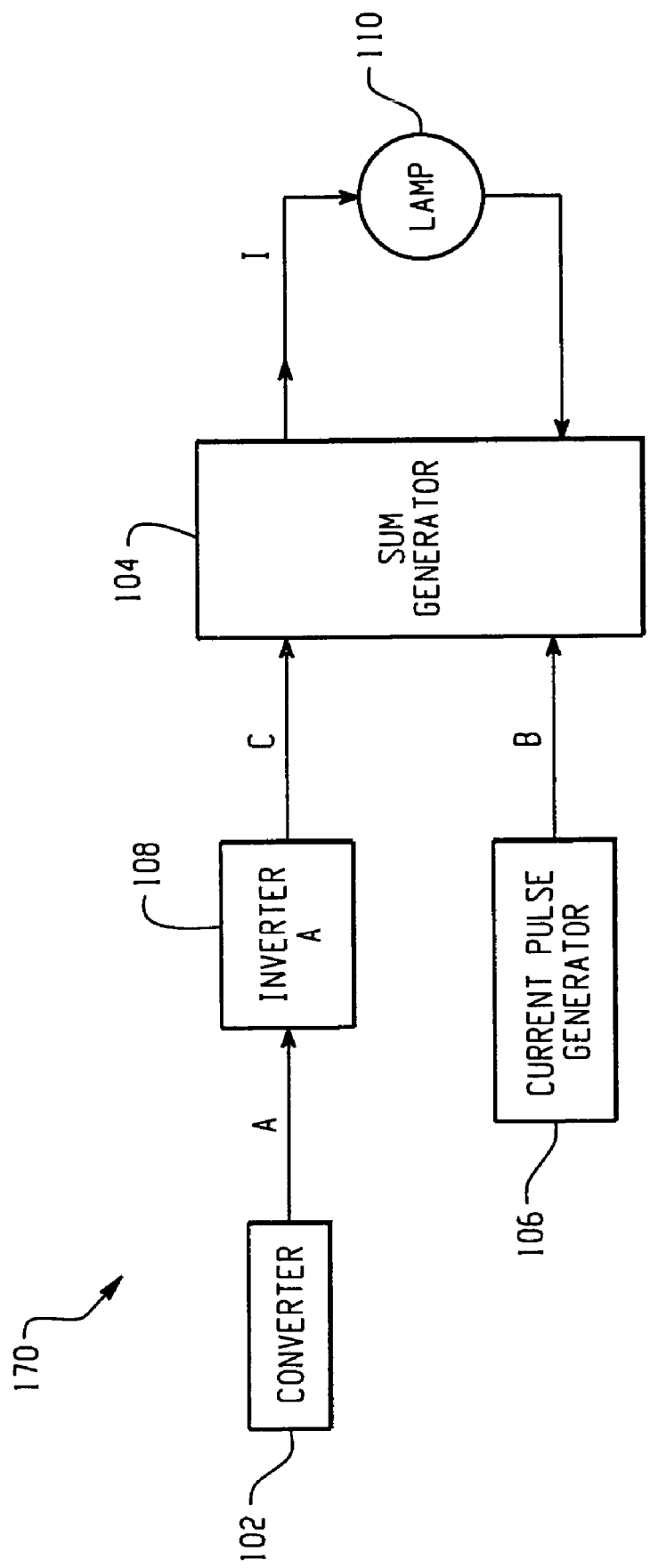
FIG. 16 illustrates an exemplary embodiment to supply a lamp current to a high pressure lamp by combining bipolar current pulses with an alternating current.

Another exemplary embodiment of a circuit 170 used to generate the described current waveforms supplied to a high pressure lamp is shown in FIG. 16. This embodiment includes converter 102 to supply a current to inverter 108 input. The converter 102 output is represented as reference character A. The inverter 108 outputs an ac current to sum generator 104. The inverter 108 output is represented as reference character C. Current pulse generator 106 supplies a current pulse waveform to another input of the sum generator 104. The current pulse generator output is represented as reference character B. The sum generator 104 combines the current pulse waveform with the ac current waveform and supplies the resulting current waveform to the high pressure lamp 110, such as a video projection lamp. The lamp input is represented as reference character I.

Figure 17:
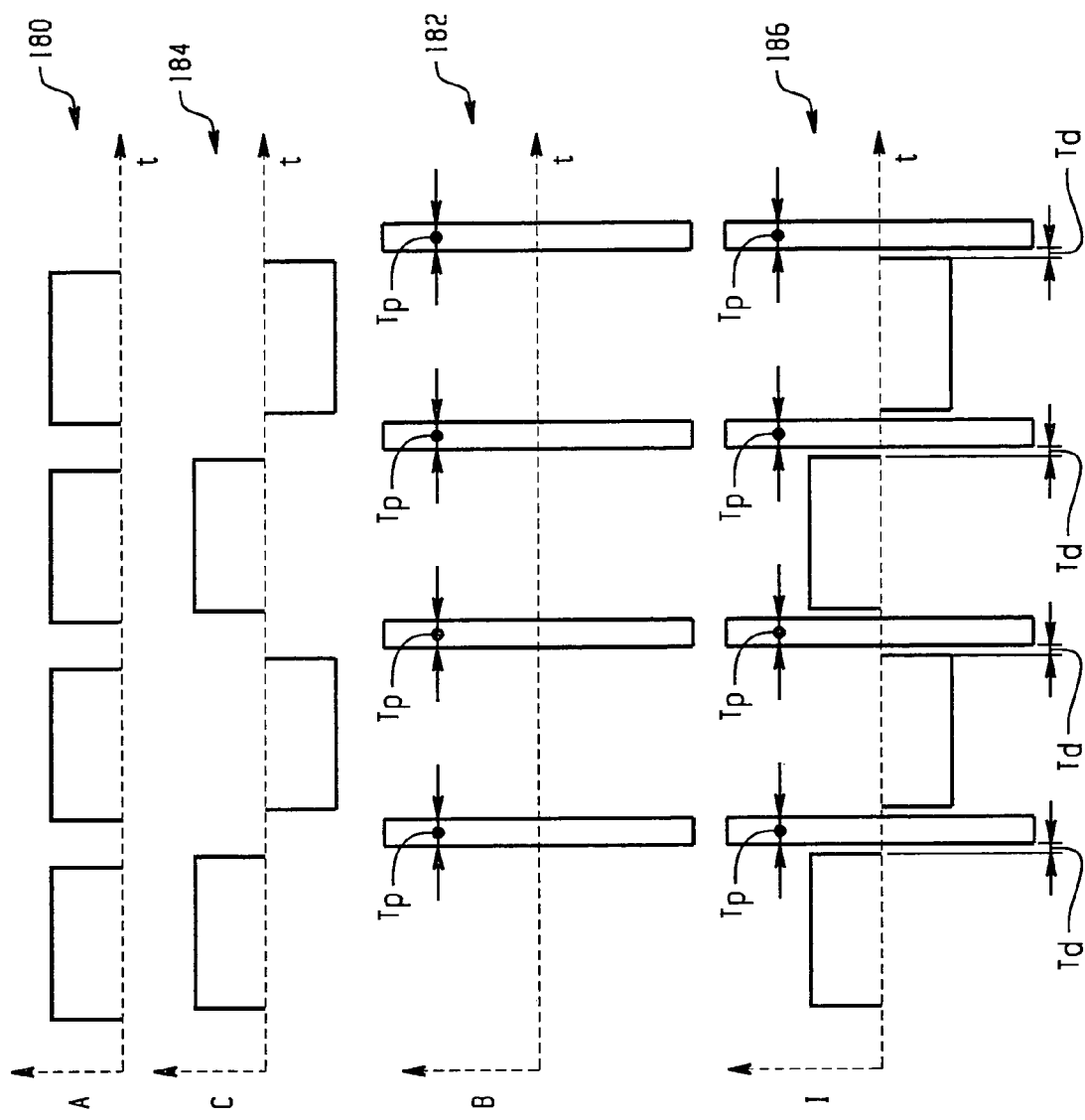
FIG. 17 illustrates the timing of the signals used to generate a lamp current, according to FIG. 16, with pulses commencing after the end of a half cycle of an alternating lamp current square wave.

Alternative waveforms with the bi-polar, or alternating polarity, pulses and their relative timing generated by the circuit 170 of FIG. 16, used to generate a lamp current with pulses commencing after the end of a half cycle of an alternating current are shown in FIG. 17. The converter 102 supplies a current 180 to the inverter 108 input, reference character A. The inverter 108 outputs an ac current 184 to the sum generator 104, reference character C. The current pulse generator 106 supplies a bipolar current pulse 182, reference character B, to the sum generator 104. The sum generator 104 combines the ac current pulse waveform 184 and the bipolar current pulse 182, after a delay of Td, and the sum generator 104 outputs an ac lamp current 186, reference character I, which is supplied to a high pressure lamp 110, such as a video projection lamp. It will be recognized that the bi-polar, or alternating polarity, current pulse could be multiple pulses as described for example with respect to the embodiment of FIG. 8, of different magnitude, or with or without a time delay Td as circumstances require.

Figure 18:
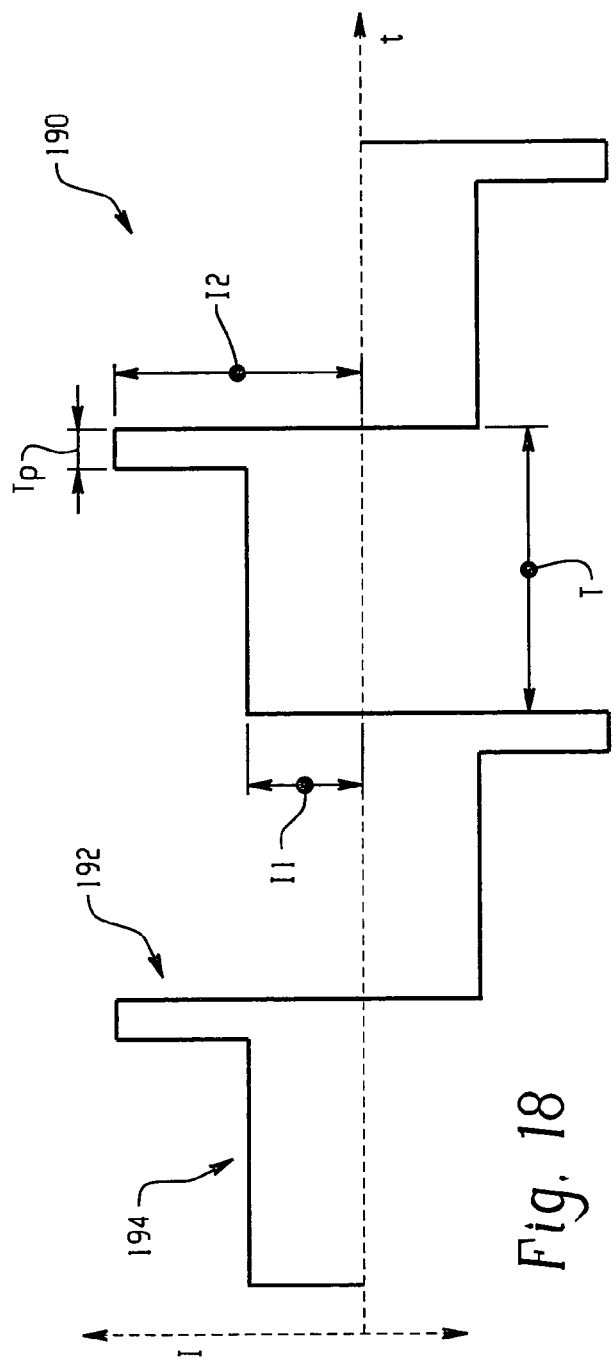
FIG. 18 illustrates a lamp current used to supply a high pressure lamp.

Referring to FIG. 18, a lamp current waveform 190 is illustrated to improve the stability of an electrode tip protrusion in a high-pressure discharge lamp and thereby reduce flickering significantly. This waveform 190 has a current pulse 192 superimposed on the last part of the half cycle of an alternating current 194. I1 represents the half cycle mean amplitude of the alternating current waveform 194 and I2 represents the half cycle mean amplitude of the current pulse. T represents the duration of time between half periods of the alternating current waveform 194 and Tp represents the half cycle time duration of current pulse 192. The current waveform 190 of FIG. 18 is used to reduce the lamp flicker of a high pressure lamp by controlling the current ratio Ri=I2/I1 and duration ratio Rt=Tp/T.

Figure 19:
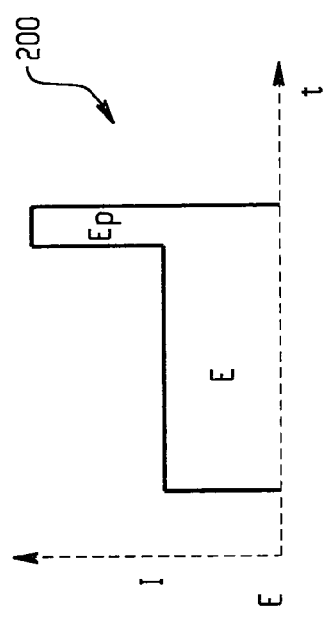
FIG. 19 illustrates an energy waveform, used to supply a high pressure lamp.

The current waveform 190 of FIG. 18 is graphically represented in FIG. 19 as an energy diagram 200 where E represents the total energy of a half cycle of the alternating current waveform 194 and Ep represents the total energy of a half cycle of the current pulse 192 added to the current waveform 194 near the end of a half cycle of the current waveform 194. The energy waveform of FIG. 19 is representative of a lamp current waveform embodiment to reduce the lamp flicker of a high pressure lamp by controlling the energy ratio Re=Ep/E.

A more stable electrode is generated with a cone-shaped tip protrusion when the duration ratio Rt and energy ratio Re are within the range of 0.2% to 5%, and Ri is within the range of 2.0 up to 4.0. In addition, a more stable electrode is generated with a cone-shaped tip protrusion when the duration ratio Rt and energy ratio Re are within the range of 15% to 50%, and Ri is within the range of 2.0 up to 4.0. The more stable cone-shape tip protrusion reduces flicker significantly.

Figure 20:
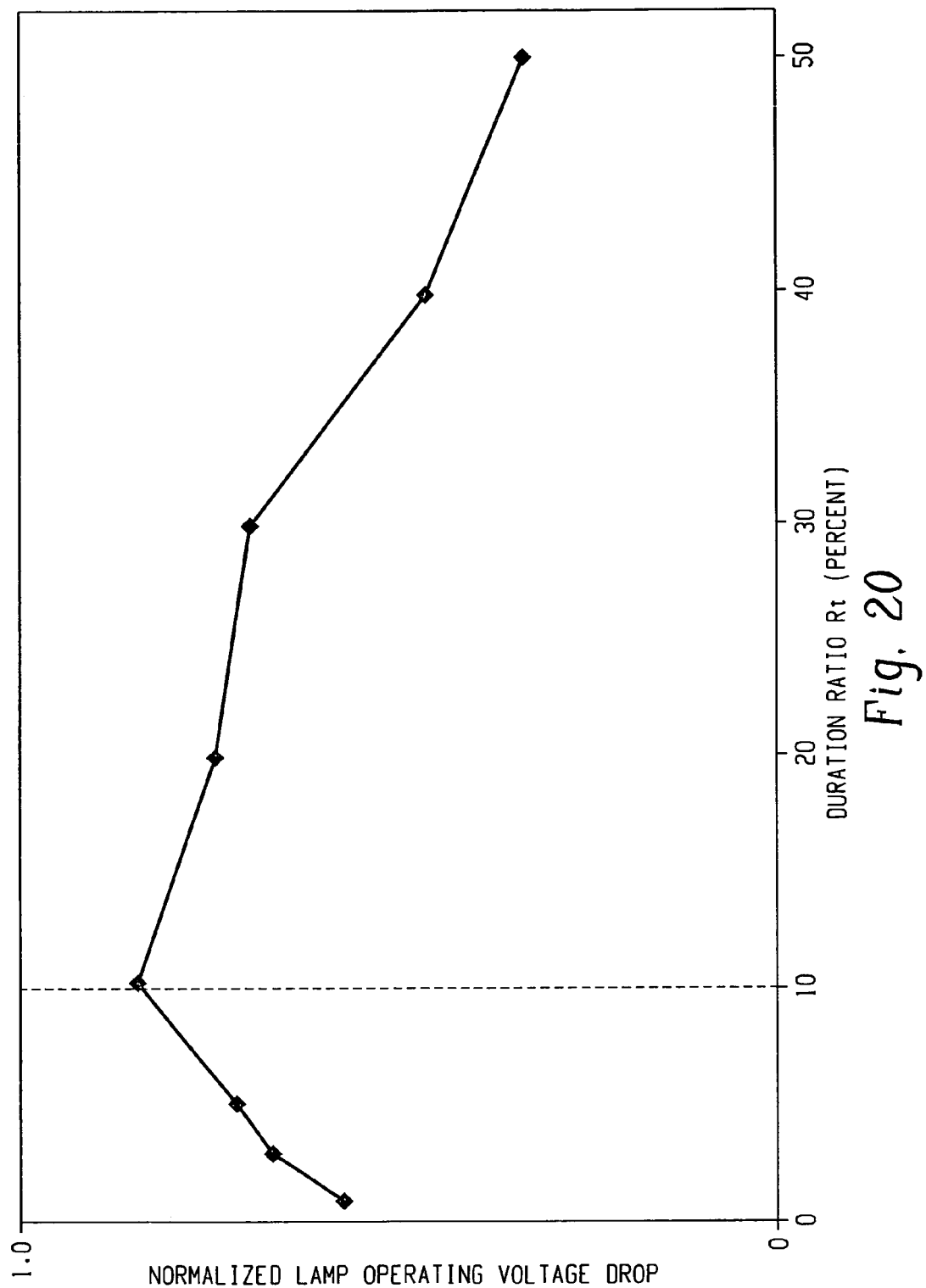
FIG. 20 illustrates lamp operation voltage drop as a function of the duration ratio Rt.
Figure 21:
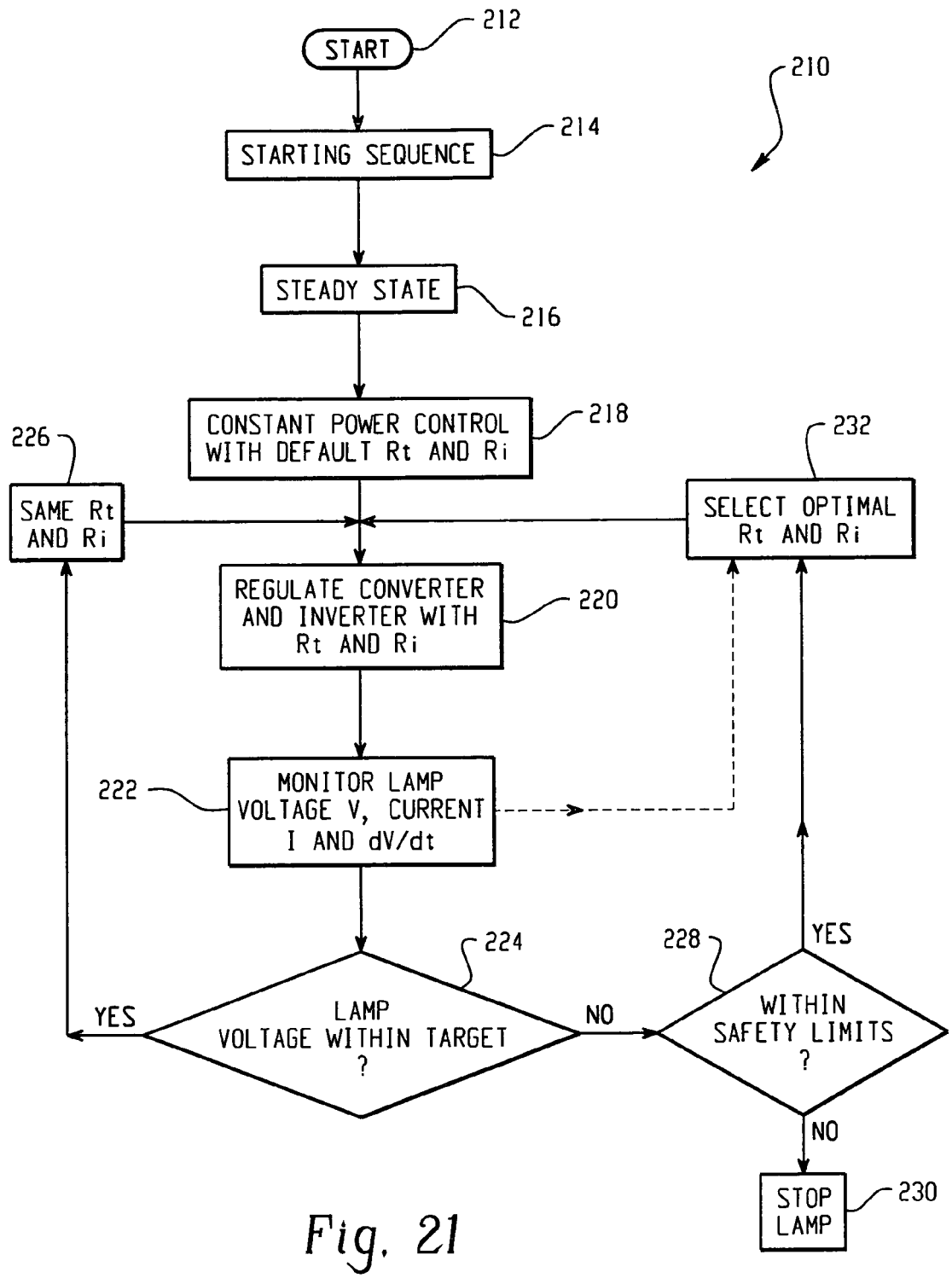
FIG. 21 is a flow chart of lamp voltage and arc gap control according to an exemplary embodiment.

Referring to FIGS. 20-21, a method of controlling the electrode tip protrusion diameter, electrode tip protrusion length, and electrode tip growth rate (also called herein arc gap control) is disclosed. The electrode tip protrusion diameter and electrode tip growth rate are significantly related to the energy ratio generated by current pulse Re, which is changed by varying current ratio Ri and duration ratio Rt of the lamp supply current. By controlling the current ratio Ri and duration ratio Rt of the lamp current to preferred ranges or values, i.e. the energy ratio Re in preferred ranges or values, the electrode tip protrusion size and electrode tip growth rate can be controlled to provide a more stable electrode tip and further reduce flicker.

Referring to FIG. 20, normalized lamp operating voltage drop ratio and corresponding duration ratio Rt are graphically illustrated. The lamp operation voltage is a very good indicator of the arc gap control. The larger the arc gap, the larger the required lamp operation voltage needed to maintain a constant power and arc. The electrode tip protrusion diameter, electrode tip protrusion length, and electrode tip growth rate are all reflected by the lamp operation voltage. As illustrated in FIG. 20, by controlling the duration ratio Rt, while maintaining a constant current ratio Ri, a decrease in lamp operating voltage can be achieved. This decrease in lamp operating voltage is a result of the electrode having a protrusion of increased diameter and length.

Normalized lamp voltage drop ratio in the initial ten (10) minutes vs. the duration ratio Rt for a generalized lamp operating system is shown in FIG. 20. This figure represents the decrease ratio of lamp operating voltage, i.e. voltage drop, after a 10 minute period at a constant current ratio (Ri not shown), versus a range of duration ratio Rt. The voltage drop is measured as the initial lamp operating voltage minus the lamp operating voltage after ten (10) minutes then divided by the initial lamp operating voltage. The illustrated relationship of FIG. 20 enables the design of a lamp driver, such as a ballast or other control circuit, by selecting Ri and Rt for each individual lamp automatically and controlling the lamp voltage to a desired target voltage by varying Ri and Rt accordingly.

The lamp operating voltage change dV/dt characteristics varies from lamp to lamp and is an important parameter used to control the lamp voltage. In addition to lamp operating voltage and current, the dV/dt values of a lamp can be feedback to a microprocessor to automatically select Rt and Ri for each individual lamp. As illustrated in FIG. 20, the duration ratio Rt graph of a lamp has a general bell shape with a higher rate of dV/dt if Rt is within the range of approximately 5 to 25. As the duration ratio Rt becomes lower than 5 or higher than 25, the rate of change of dV/dt decrease. Therefore, the lamp operating voltage can be decreased at a faster rate if Rt remains within a range of approximately 5 to 25. To reduce the lamp operating voltage at a slower rate, the Rt of the lamp operating current should be either lower than five (5) or higher than twenty-five (25), as indicated in FIG. 20. The graph illustrated in FIG. 20 is only to demonstrate the operation of an exemplary lamp as related to the duration ratio Rt. It is to be understood that a different lamp will have the same general characteristics illustrated in FIG. 20, however the curve will shift horizontally to either lower duration ratio Rt or higher duration ratio Rt depending on the lamp type. Therefore, the range of duration ratio Rt with high lamp operating voltage drop will vary from one lamp type to another. In addition, different values of the current ratio Ri for a lamp current will shift the curve of FIG. 20 up and down along the vertical axis.

The flow chart of a lamp operating voltage and arc gap control 210, which may be implemented in the circuits of FIGS. 10, 14, and 16, as well as other known lamp control circuits, is illustrated in FIG. 21. Upon start-up 212, the starting sequence 214 of a high intensity discharge (HID) lamp includes three phases of operation before reaching steady state operation 216. These phases include breakdown, arc glow and warm up. Breakdown occurs when an initial high voltage, usually on the order of kilovolts, is applied to break down the arc gap of the lamp. After the breakdown phase, the lamp is supplied a high frequency voltage to sustain an arc glow and heat the electrode. This is referred to as the arc glow phase. The warm up phase refers to the period of time, subsequent to the arc glow phase, when the lamp current is controlled to increase the lamp power until a target value is reached. After the lamp power reaches the target value, the lamp power is controlled to a constant value and steady state 216 is achieved.

To control the arc gap and thereby control the electrode(s) tip protrusion diameter, electrode tip length, and electrode(s) tip growth rate, the default pulse current ratio Ri and the pulse duration ratio Rt are set as initial default values 218 used to regulate the converter and inverter to provide a lamp current waveform 220. The lamp voltage V and lamp current I are continuously monitored and sampled 222 to calculate the lamp power and effectively control the power of the lamp to a constant value. In addition, the steady state lamp voltage change dV/dt is also monitored in step 222. These values are used to select an optimal Rt and Ri from a lookup table, a database, or a transfer function from curve fitting of FIG. 20 and determine if the lamp voltage is within the target range 224 to optimally promote electrode tip protrusion and reduce flicker. If the lamp voltage V is within this range, no change is required to the pulse current ratio Ri and pulse duration ratio Rt 226 and the control algorithm returns to regulate the converter and inverter 220. If the lamp voltage V is not within the target range, the control system algorithm first determines if the lamp voltage V is within the safe limits in step 228. This lamp voltage safety limit check determines if the lamp voltage indicates the end of the life of the lamp or is unsafe for operation. If the lamp is out of the safety limit range, the lamp is automatically shut off 230. If the lamp voltage is within the safety limit, the control algorithm calculates or selects optimal values for the pulse current ratio Ri and pulse duration ratio Rt based on lamp voltage V, current I, voltage change dV/dt and a lookup table, a database, or a transfer function from curve fitting of FIG. 20 to maintain the target lamp voltage in step 232. It is to be understood that a curve similar to FIG. 20 has to be characterized for the specific lamp type.

As illustrated in FIG. 21, changing the pulse duration ratio Rt will effectively control the lamp voltage change direction. If the lamp voltage is greater than the target, the algorithm selects a Ri and Rt that promotes electrode tip protrusion and reduces the arc gap to lower the lamp voltage to within the target range. Conversely, if the lamp voltage is lower than the target, the algorithm will select a pulse duration ratio Rt which decreases electrode tip protrusion. At the same time, the algorithm will increase the pulse current ratio Ri to melt the electrode tip and increase the lamp voltage to within the target range.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A ballast for operating a gas discharge lamp comprising:
   means for supplying an alternating lamp current, said alternating lamp current comprising a mean amplitude I1 and alternating half cycles, each half cycle occurring during a time period T; and
   means for generating one or more current pulses in the later half of time period T, said one or more current pulses comprising a mean amplitude I2 and a time duration of Tp, wherein a current ratio Ri is equal to or greater than 2.0, where Ri=I2/I1, and a duration ratio Rt is equal to or greater than 0.2% and equal to or less than 5% or in the alternative, equal to or greater than 15% and equal to or less than 50%, where Rt=Tp/T, wherein the alternating lamp current and the one or more current pulses are combined, and wherein the leading edge of the one or more current pulses commences after a time delay Td from the trailing edge of the half cycle of the alternating lamp current.

2. The ballast according to claim 1, wherein the current ratio Ri is equal to or greater than 2.0 and less than or equal to 4.0.

3. The ballast according to claim 1, wherein the current ratio Ri is equal to or greater than 2.0 and less than or equal to 4.0, and the duration ratio Rt is equal to or greater than 15% and equal to or less than 35%.

4. The ballast according to claim 1, further comprising a lamp voltage sensor adapted to sense a voltage across the gas discharge lamp and provide a feedback signal to vary one or both of Ri and Rt.

5. The ballast according to claim 1 further comprising means for selectively altering at least one of Rt and Ri to control the lamp voltage and arc gap.

6. The ballast according to claim 1, wherein the time delay Td is greater than 0.0 ms and less than or equal to 20.0 ms.

7. The ballast according to claim 1, wherein the time delay Td is greater than zero and less than or equal to 1.0 ms.

8. The ballast according to claim 1, wherein the one or more current pulses have the same polarity as the alternating lamp current half cycle.

9. The ballast according to claim 1, wherein the one or more current pulses are bi-polar.

10. The ballast in accordance with claim 1, wherein the shape of the one or more current pulses are rectangular, sinusoidal, triangular or exponential.

11. A ballast for operating a gas discharge lamp comprising:
means for supplying an alternating lamp current, said alternating lamp current comprising alternating half cycles, each half cycle occurring during a time period T; and
means for generating one or more current pulses, said one or more current pulses comprising a time duration of Tp, wherein said one or more current pulses are generated in the later half of time period T, the alternating lamp current and the one or more current pulses are combined, and the one or more current pulses commence from the end of a half cycle of the alternating lamp current, and wherein the current pulses commence after one of a time delay Td which is (i) greater than zero and less than or equal to 20.0 ms or (ii) greater than zero and less than or equal to 1.0 ms.

12. The ballast according to claim 11, wherein the one or more current pulses are the same polarity as the half cycle of the alternating lamp current.

13. The ballast according to claim 11, wherein the one or more current pulses are bi-polar.

14. The ballast according to claim 11 wherein a duration ratio Rt=Tp/T and Ri=I2/I1 and I2 is the mean amplitude of the one or more current pulses, and I1 is the mean amplitude of the alternating lamp current, the ballast further comprising means for selectively altering at least one of Rt and Ri to control the lamp voltage and arc gap.

15. A ballast for operating a gas discharge lamp comprising:
a converter to generate a dc current;
a current pulse generator to generate one or more current pulses, said one or more current pulses comprising a mean amplitude I2 and a time duration of Tp;
a sum generator for combining the dc current and the one or more current pulses into an intermediate current waveform; and
an inverter for converting the intermediate current waveform to an alternating lamp current combined with one or more current pulses, said alternating lamp current comprising a mean amplitude I1 and alternating half cycles, each half cycle occurring during a time T and said one or more current pulses comprising a mean amplitude I2 and the time duration of Tp, wherein the one or more current pulses commence in the later half of an alternating lamp current half cycle, and wherein the one or more current pulses are combined with the alternating lamp current to generate one or more current pulses in the later half of the alternating lamp current half cycle, the one or more current pulses commencing after a time delay Td from the end of a half cycle of the alternating lamp current.

16. The ballast according to claim 15, wherein a current ratio Ri ranges from 0.5 to 4.0, where Ri =I2/I1, and a duration ratio Rt ranges from 0.2% to 50%, where Rt=Tp/T.

17. The ballast according to claim 15, wherein a current ratio Ri is equal to or greater than 2.0 and less than or equal to 4.0.

18. The ballast according to claim 15, wherein the duration ratio Rt is equal to or greater than 0.2% and equal to or less than 5%.

19. The ballast according to claim 15, wherein the duration ratio Rt is equal to or greater than 15% and equal to or less than 50%.

20. The ballast according to claim 15, wherein the duration ratio Rt is equal to or greater than 15% and equal to or less than 35%.

21. The ballast according to claim 15, wherein the one or more current pulses are the same polarity as the half cycle of the alternating lamp current.

22. The ballast according to claim 15, wherein the one or more current pulses are bi-polar.

23. A ballast for operating a gas discharge lamp comprising:
a converter to generate a dc current;
a current pulse generator to generate one or more current pulses, said one or more current pulses comprising a mean amplitude I2 and a time duration of Tp;
a sum generator for combining the dc current and the one or more current pulses into an intermediate current waveform; and
an inverter for converting the intermediate current waveform to an alternating lamp current combined with one or more current pulses, said alternating lamp current comprising a mean amplitude I1 and alternating half cycles, each half cycle occurring during a time T and said one or more current pulses comprising a mean amplitude I2 and the time duration of Tp, wherein the one or more current pulses commence in the later half of an alternating lamp current half cycle after a time delay Td, wherein the time delay Td is one of (i) greater than zero and less than or equal to 20.0 ms or (ii) greater than zero and less than or equal to 1.0 ms.

24. A ballast for operating a gas discharge lamp comprising:
a converter to generate a dc current;
a first inverter for converting the dc current to an alternating lamp current, said alternating lamp current comprising a mean amplitude I1 and alternating half cycles, each half cycle occurring during a time T;
a current pulse generator to generate one or more current pulses of the same polarity, said one or more current pulses comprising a mean amplitude I2 and a time duration of Tp;
a second inverter for converting the one or more current pulses to one or more current pulses of alternate polarity; and
a sum generator for combining the alternating lamp current and the one or more bipolar current pulses, wherein the one or more bipolar current pulses are generated in the later half of an alternating lamp current half cycle, and wherein a leading edge of the one or more current pulses commences after a time delay Td from a trailing edge of the half cycle of the alternating lamp current.

25. A ballast for operating a gas discharge lamp comprising:
a converter to generate a dc current;
an inverter for converting the dc current to an alternating lamp current, said alternating lamp current comprising a mean amplitude I1 and alternating half cycles, each half cycle occurring during a time T;
a current pulse generator to generate one or more bi-polar current pulses, said one or more current pulses comprising a mean amplitude I2 and a time duration of Tp; and a sum generator for combining the alternating lamp current and the one or more current pulses, wherein the one or more current pulses are generated in the later half of an alternating lamp current half cycle, and wherein a leading edge of the one or more current pulses commences after a time delay Td from a trailing edge of the half cycle of the alternating lamp current.

26. A method of operating a lamp to control the arc gap of the lamp, comprising:
supplying a current to the lamp, the current comprising the combination of an alternating lamp current and one or more current pulses, said alternating lamp current comprising a mean amplitude I1 and alternating half cycles, each half cycle occurring during a time period T, and said one or more current pulses comprising a mean amplitude I2 and a time duration Tp, and wherein a leading edge of the one or more current pulses commences after a time delay Td from a trailing edge of the half cycle of the alternating lamp current;
providing a default current ratio Ri, where Ri=I2/I1;
providing a default duration ratio Rt, where Rt=Tp/T;
controlling the current to maintain constant power to the lamp as a function of said default current ratio Ri and said default duration ratio Rt;
supplying the current to the lamp; and
monitoring the lamp voltage V, lamp current I, and change of lamp operating voltage over a change in time dV/dt.

27. The method according to claim 26, further comprising the step of:
determining if the lamp voltage V is within a target range to produce the desired electrode tip diameter, electrode tip protrusion length and electrode tip growth rate.

28. The method according to claim 26, further comprising the step of:
determining if the lamp voltage V is within safety limits if the lamp voltage V is not within the target range to produce the desired electrode tip diameter, electrode tip protrusion length and electrode tip growth rate.

29. The method according to claim 26, further comprising the step of:
stopping the operation of the lamp if the lamp voltage V is not within the target range and not within the safety limits of the lamp.

30. The method according to claim 26, further comprising the steps of:
accessing a database comprising lamp operating voltage data as a function of Rt and Ri;
selecting a value of Rt and Ri from the database that provides the desired electrode tip diameter, electrode tip protrusion length and electrode tip growth rate for operating the lamp within the target range;
generating a current waveform of constant power; and
supplying the current waveform to the high pressure lamp.

31. The method according to claim 26, further comprising the steps of selecting a Rt and Ri value to produce the desired electrode tip diameter, electrode tip protrusion length and electrode tip growth rates, if the lamp voltage is not within the target and within the safety limits of the lamp.

* * * * *